US006973858B2

(12) United States Patent
Huang

(10) Patent No.: US 6,973,858 B2
(45) Date of Patent: Dec. 13, 2005

(54) SOCKET ASSEMBLY THAT CAN BE MOUNTED AND DETACHED QUICKLY

(76) Inventor: Jung-Chih Huang, 58, Ma Yuan West St., Taichung (TW)

( * ) Notice: Subject to any disclaimer, the term of this patent is extended or adjusted under 35 U.S.C. 154(b) by 69 days.

(21) Appl. No.: 10/652,467

(22) Filed: Aug. 29, 2003

(65) Prior Publication Data

US 2005/0045001 A1 Mar. 3, 2005

(51) Int. Cl.[7] .......................... H25B 23/16; B25B 1/00; B23B 31/12
(52) U.S. Cl. ........................ 81/177.85; 81/438; 279/82
(58) Field of Search ............................ 81/177.85, 438; 279/82

(56) References Cited

U.S. PATENT DOCUMENTS

| | | | | | |
|---|---|---|---|---|---|
| 1,138,465 | A * | 5/1915 | Fegley et al. | 279/82 |
| 2,395,534 | A * | 2/1946 | Cook | 279/82 |
| 2,838,082 | A * | 6/1958 | Lange | 81/438 |
| 3,767,218 | A * | 10/1973 | Linthicum et al. | 279/82 |
| 4,692,073 | A * | 9/1987 | Martindell | 279/82 |
| 5,934,384 | A * | 8/1999 | Wang | 81/177.85 |
| 6,053,675 | A * | 4/2000 | Holland et al. | 279/82 |
| 6,199,872 | B1 * | 3/2001 | Hasan | 81/438 |
| 6,364,318 | B1 * | 4/2002 | Bedi et al. | 279/82 |
| 6,666,114 | B1 * | 12/2003 | Lin | 81/438 |
| 6,695,321 | B2 * | 2/2004 | Bedi et al. | 279/82 |
| 6,808,182 | B2 * | 10/2004 | Lin | 279/82 |
| 2003/0131694 | A1 * | 7/2003 | Lin | 81/438 |
| 2004/0188959 | A1 * | 9/2004 | Chen | 279/82 |

* cited by examiner

*Primary Examiner*—Joseph J. Hail, III
*Assistant Examiner*—Alvin J. Grant

(57) ABSTRACT

A socket assembly includes an inner sleeve, an outer sleeve movably mounted on the inner sleeve, a space defined between the inner sleeve and the outer sleeve, and an attachment device mounted in the inner sleeve. Thus, the screwdriver head is locked by the locking member elastically, so that the screwdriver head can be mounted on and detached from the inner sleeve easily and conveniently, thereby facilitating the user mounting and removing the screwdriver head.

3 Claims, 4 Drawing Sheets

SOCKET ASSEMBLY THAT CAN BE MOUNTED AND DETACHED QUICKLY

BACKGROUND OF THE INVENTION

1. Field of the Invention

The present invention relates to a socket assembly, and more particularly to a socket assembly that can be mounted and detached easily and rapidly.

2. Description of the Related Art

A conventional socket comprises a socket body having an end formed with a hexagonal insertion recess for insertion of a screwdriver head which has a periphery formed with a positioning groove, and a positioning ball mounted in a cavity formed in the wall of the insertion recess of the socket body and locked in the positioning groove of the screwdriver head. Thus, the screwdriver head is fixed on the socket body by the positioning ball, so that the screwdriver head can be rotated by the socket body of the conventional socket.

However, it is necessary to form the cavity in the wall of the insertion recess of the socket body for positioning the positioning ball, thereby greatly complicating the manufacturing procedure, and thereby increasing costs of fabrication. In addition, the positioning ball is locked in the positioning groove of the screwdriver head, so that it is difficult to detach the screwdriver head from the insertion recess of the socket body, thereby causing inconvenience to the user.

SUMMARY OF THE INVENTION

The primary objective of the present invention is to provide a socket assembly that can be mounted and detached easily and rapidly.

Another objective of the present invention is to provide a socket assembly that can prevent the screwdriver head from being falling down when the screwdriver head is removed from the socket assembly.

A further objective of the present invention is to provide a socket assembly, wherein the screwdriver head is locked by the locking member elastically, so that the screwdriver head can be mounted on and detached from the inner sleeve easily and conveniently, thereby facilitating the user mounting and removing the screwdriver head.

A further objective of the present invention is to provide a socket assembly, wherein when the screwdriver head is pushed upward to detach from the insertion recess of the inner sleeve, the screwdriver head is attracted by the magnetic member of the attachment device, thereby preventing the screwdriver head from falling down.

In accordance with the present invention, there is provided a socket assembly, comprising:

an inner sleeve;

an outer sleeve movably mounted on the inner sleeve;

a space defined between the inner sleeve and the outer sleeve; and an attachment device mounted in the inner sleeve.

Further benefits and advantages of the present invention will become apparent after a careful reading of the detailed description with appropriate reference to the accompanying drawings.

DETAILED DESCRIPTION OF THE INVENTION

Figure 1:
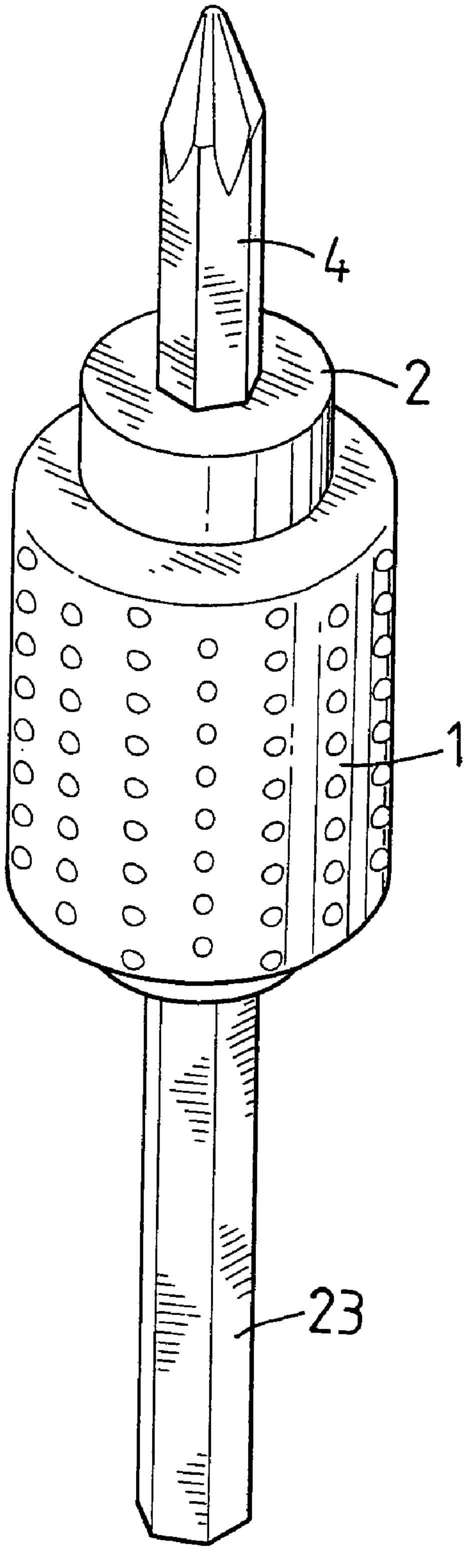
FIG. 1 is a perspective view of a socket assembly in accordance with the preferred embodiment of the present invention.

Referring to the drawings and initially to FIGS. 1–4, a socket assembly in accordance with the preferred embodiment of the present invention comprises an inner sleeve 2, an outer sleeve 1 movably mounted on the inner sleeve 2, a space 14 (see FIG. 4) defined between the inner sleeve 2 and the outer sleeve 1, and an attachment device 3 mounted in the inner sleeve 2.

The inner sleeve 2 has an inside formed with a hollow receiving chamber 21. The inner sleeve 2 has a first end formed with a hexagonal insertion recess 22 for insertion of a screwdriver head 4 which has a periphery formed with a positioning groove 41. The inner sleeve 2 has a second end provided with a connecting rod 23 which is extended outward from the inner sleeve 2. Preferably, the second end of the inner sleeve 2 has an inner wall formed with a screw bore 213 for screwing a threaded positioning cap 36, and the connecting rod 23 has an end secured on the positioning cap 36.

The outer sleeve 1 has an outer wall provided with a plurality of anti-skid bosses 11 and an inner wall having a first end formed with an arcuate resting corner 12 rested on the outer wall of the inner sleeve 2 and a second end provided with a locking ring 13 movably mounted on the inner sleeve 2. Preferably, the locking ring 13 has an outer wall formed with an annular locking groove 130, and the second end of the inner wall of the outer sleeve 1 is formed with an annular locking rib 14 locked in the locking groove 130 of the locking ring 13.

The inner sleeve 2 has a mediate portion having an outer wall formed with an annular retaining groove 25 for retaining a C-shaped snap ring 26. The socket assembly further comprises an elastic member 27 mounted on the inner sleeve 2 and urged between the snap ring 26 and the locking ring 13.

The outer wall of the inner sleeve 2 is formed with two parallel through holes 24 each communicating with the insertion recess 22. The socket assembly further comprises an elastic locking member 28 mounted in the space 14 defined between the inner sleeve 2 and the outer sleeve 1. The locking member 28 is substantially U-shaped, and has two ends each formed with a bent portion 282 rested on the arcuate resting corner 12 or the inner wall of the outer sleeve 1 and a locking portion 281 extended through a respective one of the two through holes 24 into the insertion recess 22 of the inner sleeve 2 and locked in the positioning groove 41 of the screwdriver head 4.

The attachment device 3 is received in the receiving chamber 21 of the inner sleeve 2, and includes a mounting member 31 movably mounted in the receiving chamber 21 of the inner sleeve 2, and a magnetic member 33 mounted in the mounting member 31 and rested on an end of the screwdriver head 4. The mounting member 31 of the attachment device 3 has a first end 311 and a second end 312 having a diameter greater than that of the first end 311. The first end of the mounting member 31 of the attachment device 3 is formed with a receiving recess 32 for receiving the magnetic member 33.

The attachment device 3 further includes a spring 34 urged between the second end 312 of the mounting member 31 and the second end of the inner sleeve 2. Preferably, the spring 34 is urged between the second end 312 of the mounting member 31 and the positioning cap 36.

The receiving chamber 21 of the inner sleeve 2 has a wall formed with an annular locking groove 211. The attachment device 3 further includes a C-shaped locking member 35 locked in the locking groove 211 of the inner sleeve 2. In addition, the first end 311 of the mounting member 31 is movably mounted in the locking member 35. The mounting member 31 of the attachment device 3 has a mediate portion formed with a shoulder 313 located between the first end 311 and the second end 312 and rested on the locking member 35, so that the mounting member 31 is limited in the receiving chamber 21 of the inner sleeve 2.

Figure 2:
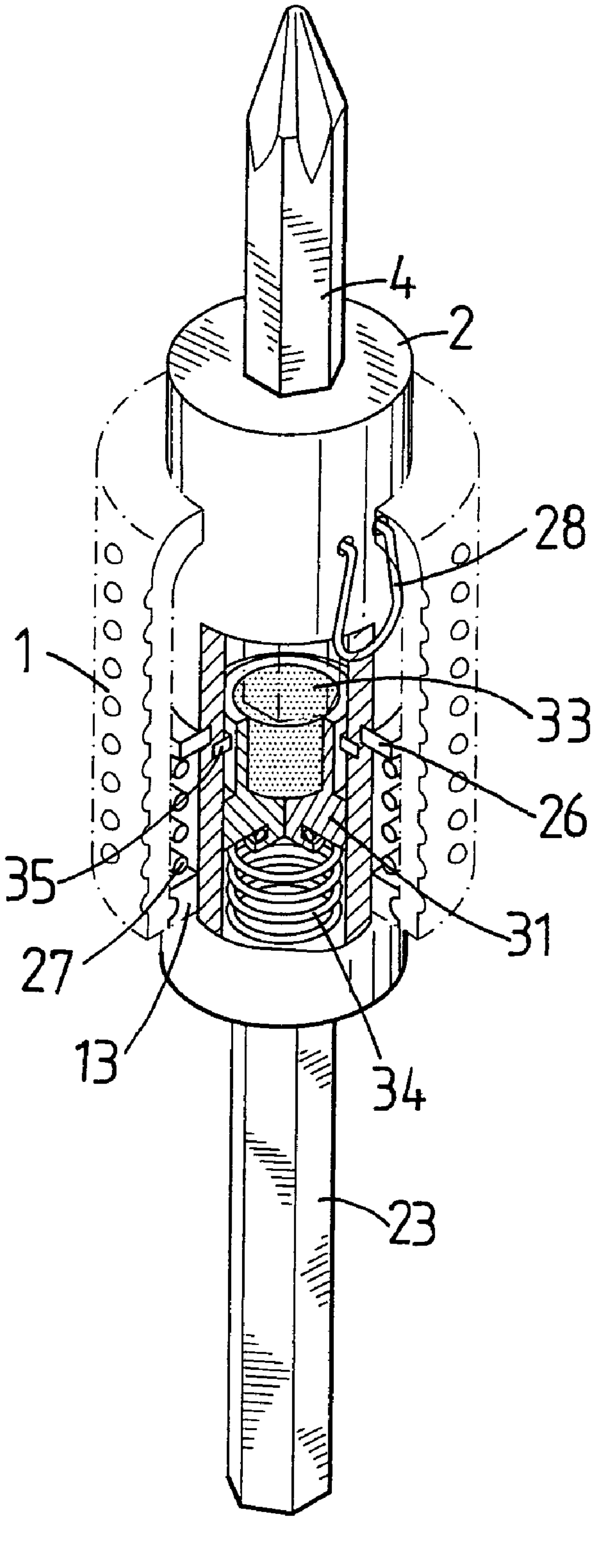
FIG. 2 is a partially cut-away perspective cross-sectional view of the socket assembly as shown in FIG. 1.
Figure 3:
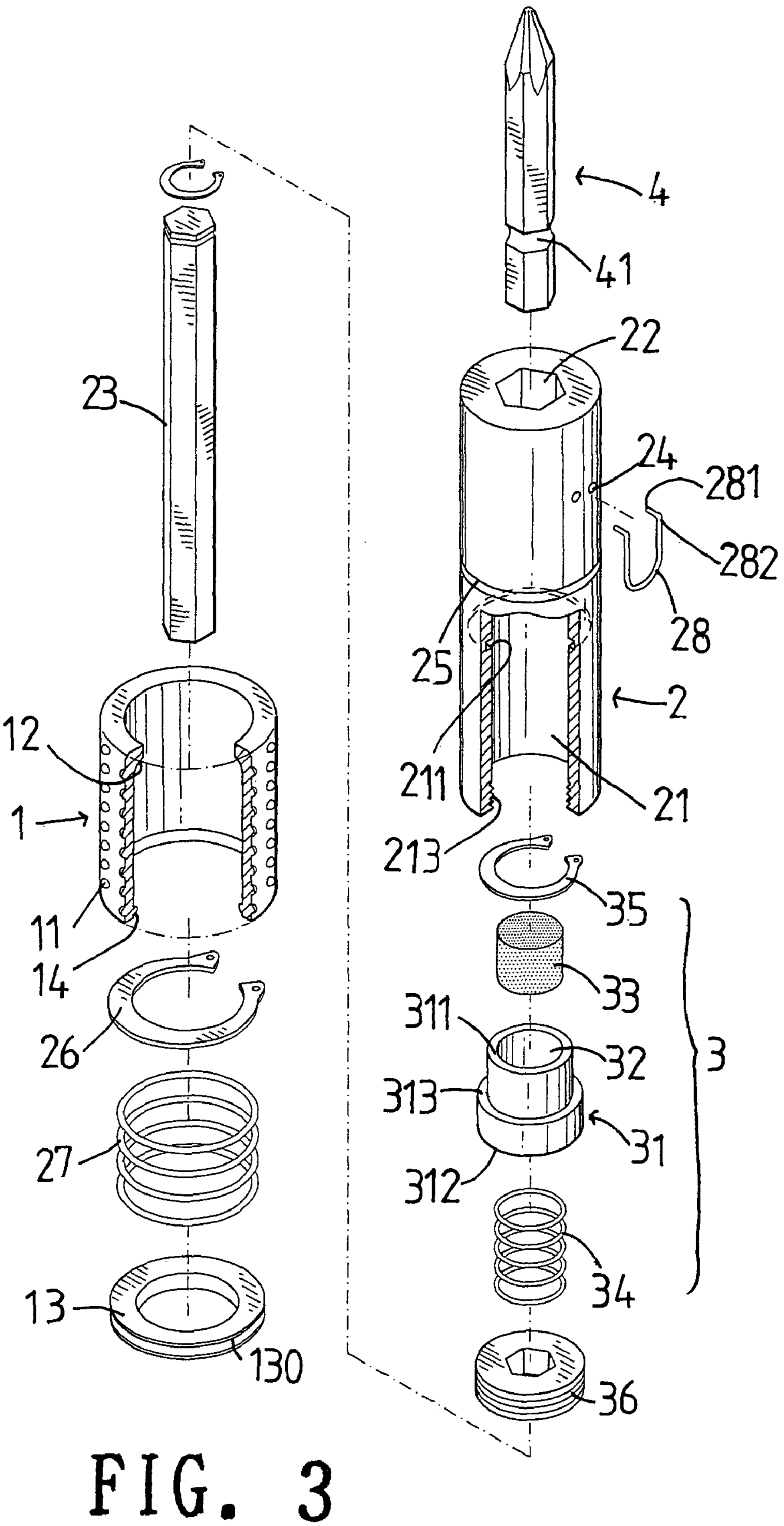
FIG. 3 is an exploded perspective view of the socket assembly as shown in FIG. 1.
Figure 4:
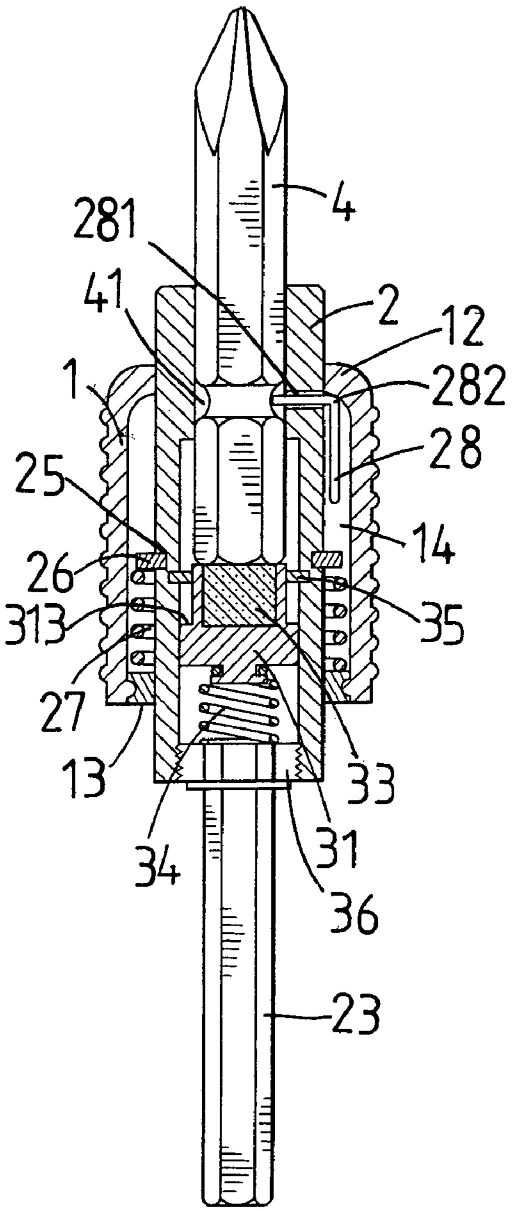
FIG. 4 is a plan cross-sectional view of the socket assembly as shown in FIG. 1.
Figure 5:
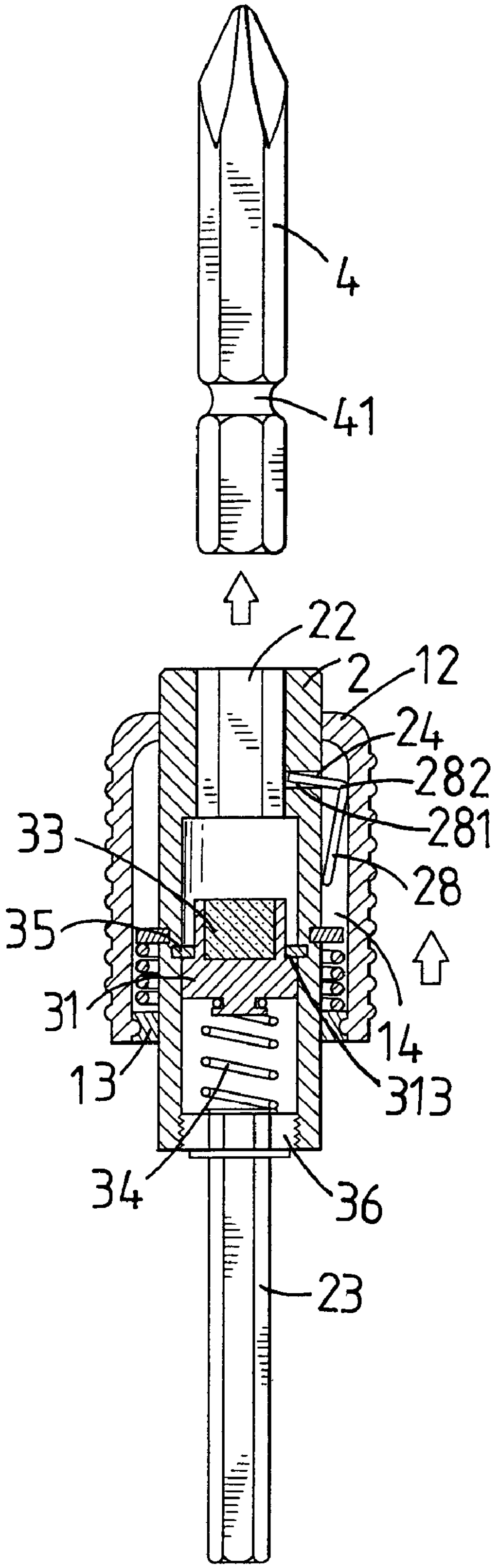
FIG. 5 is a schematic operational view of the socket assembly as shown in FIG. 4.

In operation, referring to FIGS. 4 and 5 with reference to FIGS. 1–3, the outer sleeve 1 is moved upward relative to the inner sleeve 2, so that the bent portion 282 of the locking member 28 is detached from the arcuate resting corner 12 of the outer sleeve 1. Thus, the bent portion 282 of the locking member 28 is sprung outward by the restoring force of the locking member 28 and is rested on the inner wall of the outer sleeve 1 in an inclined manner, so that the locking portion 281 of the locking member 28 is detached from the insertion recess 22 of the inner sleeve 2 and is retracted into the respective through hole 24 of the inner sleeve 2 as shown in FIG. 5. Thus, the screwdriver head 4 can be inserted into the insertion recess 22 of the inner sleeve 2 and the positioning groove 41 of the screwdriver head 4 aligns with the locking portion 281 of the locking member 28. After the screwdriver head 4 is inserted into the insertion recess 22 of the inner sleeve 2, the screwdriver head 4 is attracted by the magnetic member 33 of the attachment device 3.

After the force applied on the outer sleeve 1 is removed, the outer sleeve 1 is pressed to move downward relative to the inner sleeve 2 by the restoring force of the elastic member 27, so that the bent portion 282 of the locking member 28 is urged by the arcuate resting corner 12 of the outer sleeve 1, and the locking portion 281 of the locking member 28 is pressed and moved into the insertion recess 22 of the inner sleeve 2 and is locked in the positioning groove 41 of the screwdriver head 4 as shown in FIG. 4. Thus, the screwdriver head 4 is locked by the locking portion 281 of the locking member 28, so that the screwdriver head 4 is fixed on the inner sleeve 2.

At the same time, the mounting member 31 of the attachment device 3 is pressed downward by the screwdriver head 4, so that the shoulder 313 is detached from the locking member 35 as shown in FIG. 4. In addition, the screwdriver head 4 is locked by the locking portion 281 of the locking member 28 and is attracted by the magnetic member 33 of the attachment device 3, so that the screwdriver head 4 is fixed on the inner sleeve 2 rigidly and stably.

When the screwdriver head 4 is to be removed from the inner sleeve 2, the outer sleeve 1 is moved upward relative to the inner sleeve 2, so that the locking portion 281 of the locking member 28 is detached from the insertion recess 22 of the inner sleeve 2 and is retracted into the respective through hole 24 of the inner sleeve 2 as shown in FIG. 5. Thus, the screwdriver head 4 is pushed upward to detach from the insertion recess 22 of the inner sleeve 2 by the restoring force of the spring 34. At this time, the screwdriver head 4 is attracted by the magnetic member 33 of the attachment device 3, thereby preventing the screwdriver head 4 from falling down.

Accordingly, the screwdriver head 4 is locked by the elastic locking member 28 elastically, so that the screwdriver head 4 can be mounted on and detached from the inner sleeve 2 easily and conveniently, thereby facilitating the user mounting and removing the screwdriver head 4. In addition, when the screwdriver head 4 is pushed upward to detach from the insertion recess 22 of the inner sleeve 2, the screwdriver head 4 is attracted by the magnetic member 33 of the attachment device 3, thereby preventing the screwdriver head 4 from falling down.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A socket assembly, comprising: an inner sleeve; an outer sleeve movably mounted on the inner sleeve; a space defined between the inner sleeve and the outer sleeve; and an attachment device mounted in the inner sleeve;

wherein the inner sleeve has a first end formed with an insertion recess for insertion of a screwdriver head which has a periphery formed with an annular positioning groove formed around a periphery of the screwdriver head; and wherein the inner sleeve has an outer wall formed with two spaced through holes each communicating with the insertion recess, the outer sleeve has an inner wall having a first end formed with an arcuate resting corner rested on the outer wall of the inner sleeve, and the socket assembly further comprises an elastic locking member mounted in the space between the inner sleeve and the outer sleeve and has two ends each formed with a bent portion rested on the arcuate resting corner or the inner wall of the outer sleeve and a locking portion extended through a respective one of the two through holes into the insertion recess of the inner sleeve and locked in the positioning groove of the screwdriver head.

2. The socket assembly in accordance with claim 1, wherein the inner wall of the outer sleeve 1 has a second end provided with a locking ring 13 movably mounted on the inner sleeve 2.

3. The socket assembly in accordance with claim 2, wherein the inner sleeve has an inside formed with a hollow receiving chamber, and the attachment device is received in the receiving chamber the inner sleeve, and includes a mounting member movably mounted in the receiving chamber the inner sleeve, and a magnetic member mounted in the mounting member and rested on an end of the screwdriver head.

* * * * *